US012068521B2

(12) United States Patent
Seki et al.

(10) Patent No.: US 12,068,521 B2
(45) Date of Patent: Aug. 20, 2024

(54) DIRECTIONAL COUPLER

(71) Applicant: Murata Manufacturing Co., Ltd., Kyoto (JP)

(72) Inventors: Kenta Seki, Kyoto (JP); Ryangsu Kim, Kyoto (JP); Katsuya Shimizu, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 373 days.

(21) Appl. No.: 17/455,250

(22) Filed: Nov. 17, 2021

(65) Prior Publication Data

US 2022/0077559 A1 Mar. 10, 2022

Related U.S. Application Data

(63) Continuation of application No. PCT/JP2020/019828, filed on May 19, 2020.

(30) Foreign Application Priority Data

May 23, 2019 (JP) ................................ 2019-096776

(51) Int. Cl.
*H01P 5/18* (2006.01)

(52) U.S. Cl.
CPC ................ *H01P 5/18* (2013.01); *H01P 5/185* (2013.01)

(58) Field of Classification Search
CPC .. H01P 5/185; H01P 5/18; H01P 5/184; H01P 5/187; H01P 1/203; H01P 5/10; H01P 11/003; H04L 25/0272; H04L 25/03031; H04L 25/03878; H04L 25/0264; H03H 7/383; H03H 7/06; H03H 7/38
See application file for complete search history.

(56) References Cited

U.S. PATENT DOCUMENTS

| | | | | |
|---|---|---|---|---|
| 2004/0066236 A1* | 4/2004 | Fujimoto | H03B 5/1228 330/302 |
| 2005/0024178 A1 | 2/2005 | Ancey et al. | |
| 2006/0170500 A1 | 8/2006 | Fujimoto et al. | |
| 2013/0207739 A1* | 8/2013 | Bakalski | H04B 1/18 333/33 |
| 2013/0265111 A1 | 10/2013 | Ota et al. | |
| 2016/0172737 A1 | 6/2016 | Srirattana et al. | |

(Continued)

FOREIGN PATENT DOCUMENTS

| | | |
|---|---|---|
| CN | 103326684 A | 9/2013 |
| CN | 107210507 A | 9/2017 |

(Continued)

OTHER PUBLICATIONS

International Search Report for PCT/JP2020/019828 dated Aug. 18, 2020.
Written Opinion for PCT/JP2020/019828 dated Aug. 18, 2020.

*Primary Examiner* — Lincoln D Donovan
*Assistant Examiner* — Tyler J Pereny
(74) *Attorney, Agent, or Firm* — Pearne & Gordon LLP

(57) ABSTRACT

A directional coupler includes a main line, a secondary line, and a variable terminator. The variable terminator includes a variable inductor. The variable inductor includes a plurality of inductors coupled in series with each other between an end portion of the secondary line and the ground and switches configured to bypass at least one inductor of the plurality of inductors.

14 Claims, 7 Drawing Sheets

(56) References Cited

U.S. PATENT DOCUMENTS

| | | | | |
|---|---|---|---|---|
| 2017/0324392 | A1* | 11/2017 | Srirattana | ............... H01P 5/185 |
| 2020/0021003 | A1* | 1/2020 | Kim | ................... H01R 13/6625 |

FOREIGN PATENT DOCUMENTS

| | | | |
|---|---|---|---|
| JP | 2004-165612 | A | 6/2004 |
| JP | 2005-057270 | A | 3/2005 |
| JP | 2017-537555 | A | 12/2017 |
| WO | 2012/157645 | A1 | 11/2012 |
| WO | 2018/174042 | A1 | 9/2018 |

* cited by examiner

DIRECTIONAL COUPLER

CROSS REFERENCE TO RELATED APPLICATION

This is a continuation of International Application No. PCT/JP2020/019828 filed on May 19, 2020 which claims priority from Japanese Patent Application No. 2019-096776 filed on May 23, 2019. The contents of these applications are incorporated herein by reference in their entireties.

BACKGROUND

Technical Field

The present disclosure relates to a directional coupler.

Directional couplers are basic components widely used for radio devices such as mobile terminal devices. For example, Patent Document 1 discloses a radio frequency coupler having a main line, a coupled line, and a termination impedance circuit capable of terminating a port of the coupled line with an adjustable impedance (for example, FIG. 16A in Patent Document 1). The termination impedance circuit disclosed in Patent Document 1 includes a plurality of inductors and a plurality of switches. In response to states of the plurality of switches, a particular number equal to or greater than one of the plurality of inductors are coupled in parallel with each other.

Patent Document 1: Japanese Unexamined Patent Application Publication (Translation of PCT Application) No. 2017-537555

BRIEF SUMMARY

For example, the termination impedance of the termination impedance circuit described in Patent Document 1 is controlled such that, as the number of inductors coupled in parallel with each other (or the total inductance of inductors coupled in parallel with each other) increases, the inductance decreases. To obtain a significantly large amount of inductance in such a termination impedance circuit, the termination impedance circuit needs to include an inductor of a large amount of inductance.

An inductor of a large amount of inductance usually occupies a large area, and as a result, it is difficult to space the inductor and main and secondary lines apart from each other in a miniaturized coupler. Consequently, unnecessary coupling may occur between the inductor and the main and secondary lines, which degrades characteristics of the coupler.

The present disclosure provides a compact directional coupler with excellent characteristics having a main line, a secondary line, and a termination impedance circuit for providing an adjustable impedance (in particular, adjustable inductance) for the secondary line.

A directional coupler according to an aspect of the present disclosure includes a main line, a secondary line, and a variable terminator. The variable terminator includes a variable inductor. The variable inductor includes a plurality of inductors coupled in series with each other between an end portion of the secondary line and ground and a switch configured to bypass at least one of the plurality of inductors.

In the directional coupler according to the present disclosure, the maximum amount of inductance required for the variable inductor can be obtained by adding the inductances of the plurality of inductors coupled in series with each other. As such, the inductance of each of the plurality of inductors can be lower than the maximum amount of inductance required for the variable inductor, and the plurality of inductors can be downsized.

Because the plurality of inductors constituting the variable inductor can be downsized, it is possible to increase the flexibility in arranging the inductors. It is thus easy to place the inductors and the main line and the secondary line apart from each other in the miniaturized directional coupler.

This can consequently hinder unnecessary coupling between the inductors and the main line and the secondary line, and as a result, it is easy to prevent degradation of characteristics of the directional coupler due to unnecessary coupling, in particular, degradation of directivity and variations in the degree of coupling. Accordingly, a compact directional coupler with excellent characteristics can be implemented.

DETAILED DESCRIPTION

Embodiments of the present disclosure will be described in detail with reference to the drawings. It should be noted that the embodiments described below are specific or comprehensive examples. Specifics including numerical values, shapes, materials, constituent elements, arrangements of the constituent elements, and modes of connection given in the following embodiments are mere instances and are not intended to limit the present disclosure.

In the following embodiments, the term "couple" denotes that two or more objects or parts of objects are coupled to each other directly or by using one or more components, circuit elements, or connection materials such as solders.

First Embodiment

A directional coupler according to a first embodiment will be described by using as an example a high frequency coupler including a main line, a secondary line, and a variable terminator coupled to an end portion of the secondary line and configured to terminate the end portion of the secondary line with an adjustable impedance.

Figure 1:
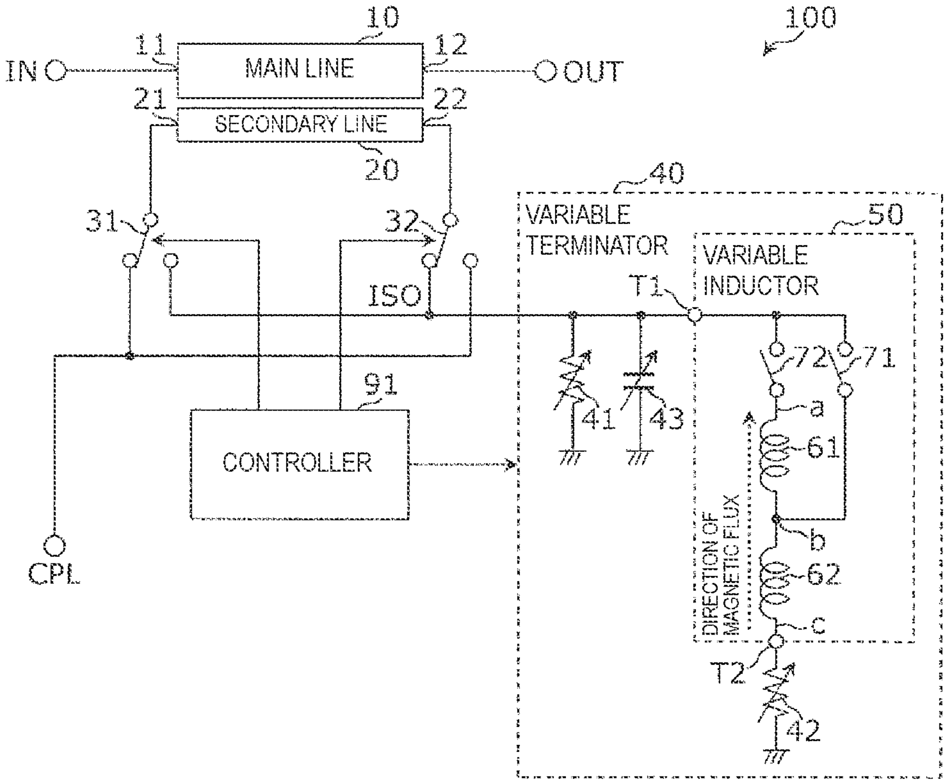
FIG. 1 is a circuit diagram illustrating an example of a configuration of a directional coupler according to a first embodiment.

FIG. 1 is a circuit diagram illustrating an example of a configuration of the directional coupler according to the first embodiment.

As illustrated in FIG. 1, a directional coupler 100 is constituted by a main line 10, a secondary line 20, switches 31 and 32, a variable terminator 40, and a controller 91.

The main line 10 and the secondary line 20 are electromagnetically coupled to each other. As a result, when an end portion 22 of the secondary line 20 is terminated, a portion of a main signal transferred through the main line 10 from an end portion 11 to an end portion 12 is outputted as a detection signal from an end portion 21 of the secondary line 20. When the end portion 21 of the secondary line 20 is terminated, a portion of a main signal transferred through the main line 10 from the end portion 12 to the end portion 11 is outputted as a detection signal from the end portion 22 of the secondary line 20.

The direction in which the main signal is transferred through the main line 10 from the end portion 11 to the end portion 12 may be defined as a forward direction, and the direction in which the main signal is transferred from the end portion 12 to the end portion 11 may be defined as a reverse direction. According to these definitions, when a detection signal corresponding to a main signal in the forward direction is obtained, the end portion 22 of the secondary line 20 is an end portion for termination, and the end portion 21 is an end portion for outputting a detection signal. When a detection signal corresponding to a main signal in the reverse direction is obtained, the end portion 21 of the secondary line 20 is an end portion for termination, and the end portion 22 is an end portion for outputting a detection signal. The forward and reverse directions may be opposite to the definitions described above.

The end portion 11 of the main line 10 is coupled to an input port IN, and the end portion 12 is coupled to an output port OUT. Of the end portions 21 and 22 of the secondary line 20, an end portion for signal output is coupled to a coupled port CPL via the switch 31 or 32, whereas an end portion for termination is coupled to an isolation port ISO via the switch 31 or 32. In this manner, with the directional coupler 100, detection signals corresponding to main signals (for example, traveling and reflected waves) in both the forward and reverse directions can be obtained from the coupled port CPL in accordance with switching of the switches 31 and 32.

The variable terminator 40 is coupled to the isolation port ISO. The variable terminator 40 includes variable resistors 41 and 42, a variable capacitor 43, and a variable inductor 50.

The variable inductor 50 includes inductors 61 and 62 and switches 71 and 72.

The inductors 61 and 62 are coupled in series with each other between an end T1 of the variable inductor 50 (one end of the variable inductor 50) and an end T2 (the other end of the variable inductor 50). The inductors 61 and 62 are an example of a plurality of inductors coupled in series with each other between the isolation port ISO (that is, an end portion of the secondary line 20) and the ground. The inductors 61 and 62 are an example of a first inductor and a second inductor.

The inductors 61 and 62 may be coupled to each other by inductive coupling (also referred to as magnetic-field coupling). In the example in FIG. 1, when current flows in the inductors 61 and 62, the magnetic flux is generated through each of the inductors 61 and 62 in the same direction, and as a result, the inductors 61 and 62 are inductively coupled in a direction in which the inductors 61 and 62 mutually strengthen the magnetic flux.

In definition, the inductors 61 and 62 may be inductively coupled to each other when, for example, one or more of the following conditions are fulfilled: (1) the inductors 61 and 62 are formed as windings wound around the same center point; (2) the inductors 61 and 62 are formed as parallel straight lines; and (3) when the inductors 61 and 62 are viewed from a top-view position, the outer circumference of one of the inductors 61 and 62 is within the outer circumference of the other of the inductors 61 and 62.

One end (lower end in FIG. 1) of the switch 71 is coupled to a node between the inductors 61 and 62, whereas the other end (upper end in FIG. 1) is coupled to the end T1 of the variable inductor 50. One end (lower end in FIG. 1) of the switch 72 is coupled to the inductor 61, which is the closest one of the inductors 61 and 62 to the end T1 of the variable inductor 50, whereas the other end (upper end in FIG. 1) is coupled to the end T1 of the variable inductor 50. The switch 71 is an example of a switch for bypassing at least the inductor 61 of the inductors 61 and 62. The switch 71 is an example of a first switch. This means that, when a short circuit is created by using the switch 71, signals bypass the inductor 61.

Because the switch 72 creates a bypass in cooperation with the switch 71, the switch 72 is an example of a switch for bypassing at least the inductor 61 of the inductors 61 and 62. The switch 72 is an example of a second switch. This means that, when a short circuit is created by using the switch 71, and the switch 72 is disconnected, signals bypass the inductor 61.

When both the switches 71 and 72 are disconnected, both the variable inductor 50 and the variable resistor 42 are separated from the directional coupler 100. In accordance with the level of termination impedance required by the secondary line, the switches 71 and 72 may be disconnected to separate both the variable inductor 50 and the variable resistor 42.

The variable resistor 41 and the variable capacitor 43 are coupled between a signal path connecting the isolation port ISO and the end T1 of the variable inductor 50 and the ground. The variable resistor 42 is coupled between the end T2 of the variable inductor 50 and the ground.

The controller 91 changes the state of the switches 31, 32, 71, and 72, the resistance of the variable resistors 41 and 42, and the capacitance of the variable capacitor 43.

Although the variable resistors 41 and 42 and the variable capacitor 43 are not limited to particular configurations, the variable resistors 41 and 42 and the variable capacitor 43 may be configured as described below as an example.

Figure 2:
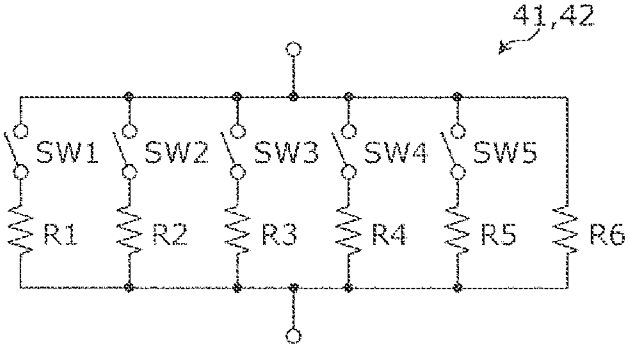
FIG. 2 is a circuit diagram illustrating an example of a configuration of variable resistors according to the first embodiment.
Figure 3:
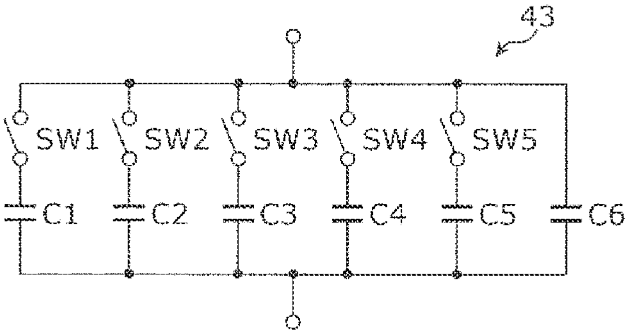
FIG. 3 is a circuit diagram illustrating an example of a configuration of a variable capacitor according to the first embodiment.

FIGS. 2 and 3 are circuit diagrams illustrating an example of a configuration of the variable resistors 41 and 42 and an example of a configuration of the variable capacitor 43.

As illustrated in FIG. 2, the variable resistors 41 and 42 each includes a plurality of resistance elements having a fixed level of resistance and a plurality of switches for coupling any resistance elements of the plurality of resistance elements in parallel with each other. The resistance of the variable resistor 41 and the resistance of the variable resistor 42 are controlled in accordance with the coupled resistance elements. In the variable resistors 41 and 42, the switches may couple any resistance elements of the plurality of resistance elements in series with each other (not illustrated in the drawings).

As illustrated in FIG. 3, the variable capacitor 43 includes a plurality of capacitive elements having a fixed amount of capacitance and a plurality of switches for coupling any capacitive elements of the plurality of capacitive elements in parallel with each other. The capacitance of the variable capacitor 43 is controlled in accordance with the coupled capacitive elements.

The resistance of the variable resistor 41 and the resistance of the variable resistor 42 in FIG. 2 and the capacitance of the variable capacitor 43 in FIG. 3 are controlled by the controller 91 switching the switches.

Because the variable terminator 40 includes the variable resistors 41 and 42, the variable capacitor 43, and the variable inductor 50, which all can change corresponding values by using switches, a desired degree of coupling and a desired directivity can be achieved in the operational band width of the directional coupler 100. Particularly, because the variable resistor 42 is coupled between the variable inductor 50 and the ground, it is easy to widen the operational band width in which high directivity can be achieved, and consequently, it is easier to perform adjustment.

The switches 31 and 32 and the switches used to obtain adjustable impedance in the variable terminator 40 may be implemented by, for example, transistors, microelectromechanical systems (MEMS) switches, or diode switches.

Next, details of an operation of the variable inductor 50 will be described.

When the switch 71 is in an off-state and the switch 72 is in an on-state, the variable inductor 50 operates as an inductor formed by the inductors 61 and 62 in series. The inductance of the variable inductor 50 is the total of the inductance of the inductor 61 and the inductance of the inductor 62.

When the inductors 61 and 62 are inductively coupled to each other in the direction in which the inductors 61 and 62 mutually strengthen the magnetic flux, the inductance of the variable inductor 50 is higher than the total obtained by simply adding the inductance of the inductor 61 and the inductance of the inductor 62 due to self-induction. Hence, the inductance required for the variable inductor 50 can be obtained by using the inductors 61 and 62 having inductance (in other words, size) smaller than if the inductors 61 and 62 are not inductively coupled to each other.

When the switch 71 is in an on-state and the switch 72 is in an off-state, the variable inductor 50 operates as an inductor formed by only the inductor 62. As a result, the inductance of the variable inductor 50 is equal to the inductance of the inductor 62.

When the switch 71 is in an on-state and the switch 72 is in an on-state, a short ring including the inductor 61 is formed. The short ring inhibits changes in the magnetic flux through the inductor 62, and as a result, the inductance of the variable inductor 50 is lower than the inductance of the inductor 62.

As described above, the variable inductor 50 exhibits at least three kinds of inductance in response to the state of the switches 71 and 72.

The maximum amount of inductance required for the variable inductor 50 can be obtained by adding the inductance of the inductor 61 and the inductance of the inductor 62, and furthermore, it is possible to increase the inductance by inductive coupling of the inductors 61 and 62. As such, the inductance of the inductor 61 and the inductance of the inductor 62 can be lower than the maximum amount of inductance required for the variable inductor 50, and the inductors 61 and 62 can be downsized.

As an example for evaluation, a variable inductor formed by a 3 nH inductor and a 1 nH inductor in series can be given in which the inductance is adjustable between two kinds of values of 3 nH and 4 nH by adding inductances. In such a variable inductor, the size of each inductor can be 50% to 70% smaller than if a variable inductor includes a 3 nH inductor and a 4 nH inductor individually provided without necessarily adding inductances.

Because the inductors 61 and 62 constituting the variable inductor 50 can be downsized, it is possible to increase the flexibility in arranging the inductors 61 and 62. It is thus easy to place the inductors 61 and 62 and the main line 10 and the secondary line 20 apart from each other in the miniaturized directional coupler 100. This can consequently hinder unnecessary coupling between the inductors 61 and 62 and the main line 10 and the secondary line 20, and as a result, it is easy to prevent degradation of characteristics of the directional coupler 100 due to unnecessary coupling, in particular, degradation of directivity and variations in the degree of coupling.

Additionally, because the inductors 61 and 62 are inductively coupled to each other in the direction in which the inductors 61 and 62 mutually strengthen the magnetic flux, the inductors 61 and 62 can be further downsized, and the effect described above can be achieved in a more solid manner.

As will be described later, the inductors 61 and 62 may be inductively coupled to each other in a direction in which the inductors 61 and 62 mutually weaken the magnetic flux. In this case, the inductance of the variable inductor 50 is smaller than the total obtained by simply adding the inductance of the inductor 61 and the inductance of the inductor 62.

In this case, although the inductance of the variable inductor 50 decreases, the equivalent series resistance of the inductors 61 and 62 and the switches 71 and 72 hardly changes. As a result, the decrease in the Q factor of the variable inductor 50 can increase the operational band width of the variable terminator 40.

Increasing and decreasing the inductance of the variable inductor 50 by inductive coupling of the inductors 61 and 62 can be used to improve the flexibility in adjusting the inductance of the variable inductor 50, and consequently, adjusting the impedance of the variable terminator 40.

Next, details of a structure of the inductors 61 and 62 will be described.

Figure 4:
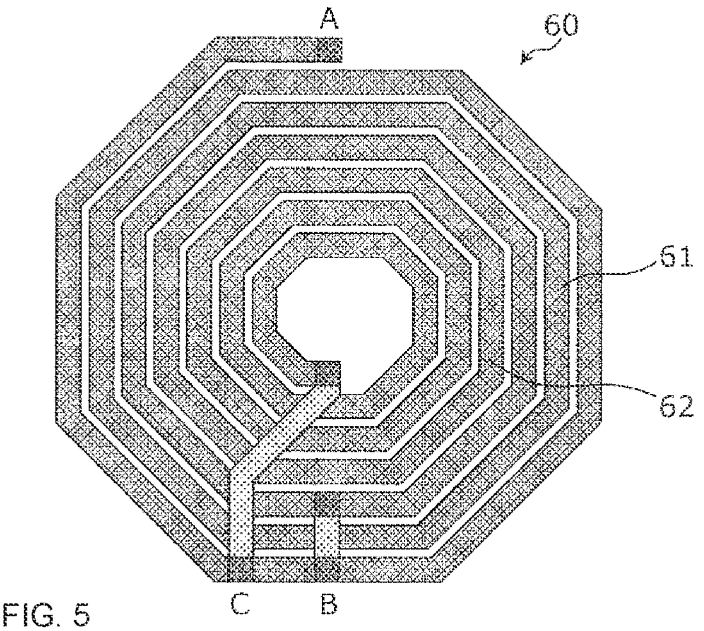
FIG. 4 is a simple illustration of an example of a structure of an inductor according to the first embodiment.

FIG. 4 is a simple illustration of an example of a structure of the inductors 61 and 62 in a simple manner. As illustrated in FIG. 4, the inductors 61 and 62 are formed by a spiral inductor 60 having an outer turn end A, a middle lead point (also referred to as tap) B, and an inner turn end C. One of an outer turn portion from the outer turn end A to the tap B and an inner turn portion from the tap B to the inner turn end C functions as the inductor 61, and the other functions as the inductor 62.

Because the inductors 61 and 62 are formed by the spiral inductor 60, the inductors 61 and 62 can be formed in a planar manner at an integrated circuit (IC) chip.

While the spiral inductor 60 includes different portions (outer turn portion and inner turn portion) each functioning as a single inductor, the entire spiral inductor 60 can achieve small size (small area) with a relatively large amount of inductance due to self-induction. A spiral inductor usually needs to route a lead line from an inner turn end outside by bypassing another portion of the wire forming the spiral inductor, and thus, adding a lead line from a tap in such a bypass manner highly matches the spiral inductor with respect to structure. The spiral inductor can be formed in a planar shape except for the solid structure of the lead line, and thus, the spiral inductor can achieve the self-induction effect and is also suitable for miniaturization.

In the example in FIG. 4, the outer turn end A, the tap B, and the inner turn end C of the spiral inductor 60 respectively correspond to points a, b, and c in FIG. 1. In this case, the outer turn portion of the spiral inductor 60, which is the portion from the outer turn end A to the tap B, corresponds to the inductor 61, and the inner turn portion, which is the portion from the tap B to the inner turn end C, corresponds to the inductor 62.

With these correspondences, the outer turn portion of the spiral inductor 60 can have a magnetic path longer than the magnetic path of the inner turn portion. As a result, the inductor 61 can easily have a relatively large amount of inductance with respect to the number of turns.

For example, the outer turn end A, the tap B, and the inner turn end C of the spiral inductor 60 may respectively correspond to the points c, b, and a in FIG. 1. In this case, the inner turn portion of the spiral inductor 60 corresponds to the inductor 61, and the outer turn portion corresponds to the inductor 62.

With these correspondences, the outer turn end A of the spiral inductor 60 is grounded, and thus, the voltage amplitude at the outer turn portion of the spiral inductor 60 is higher than the inner turn portion. Moreover, the magnetic flux through the inner turn portion of the spiral inductor 60 leaks into the surrounding region less than the outer turn portion. This can facilitate reduction of unnecessary electric-field coupling between both the inductors 61 and 62 and the main line 10 and the secondary line 20.

Next, details of characteristics (in particular, frequency characteristics to the degree of coupling and the directivity) of the directional coupler 100 will be described while comparing a practical example and a comparative example. Here, the directional coupler 100 is the practical example, and a directional coupler (not illustrated in the drawings) formed by removing the variable inductor 50 and the variable resistor 42 from the directional coupler 100 is the comparative example. Specifically, the practical example is a directional coupler having a variable terminator including a variable inductor and a variable resistor coupled in series with each other in addition to a variable resistor and a variable capacitor. The comparative example is a directional coupler in which a variable terminator is formed by only a variable resistor and a variable capacitor.

Figure 5:
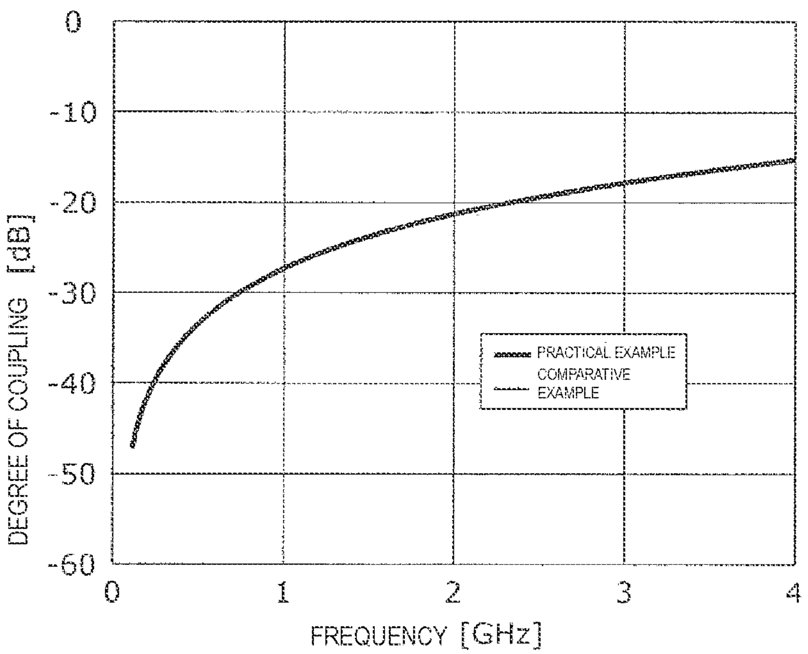
FIG. 5 is a graph illustrating an example of the degree of coupling of a directional coupler according to a practical example and the degree of coupling of a directional coupler according to a comparative example.

FIG. 5 is a graph illustrating an example of the degree of coupling of the directional coupler according to the practical example and the degree of coupling of the directional coupler according to the comparative example. As illustrated in FIG. 5, the degree of coupling of the practical example is equal to the degree of coupling of the comparative example.

Figure 6:
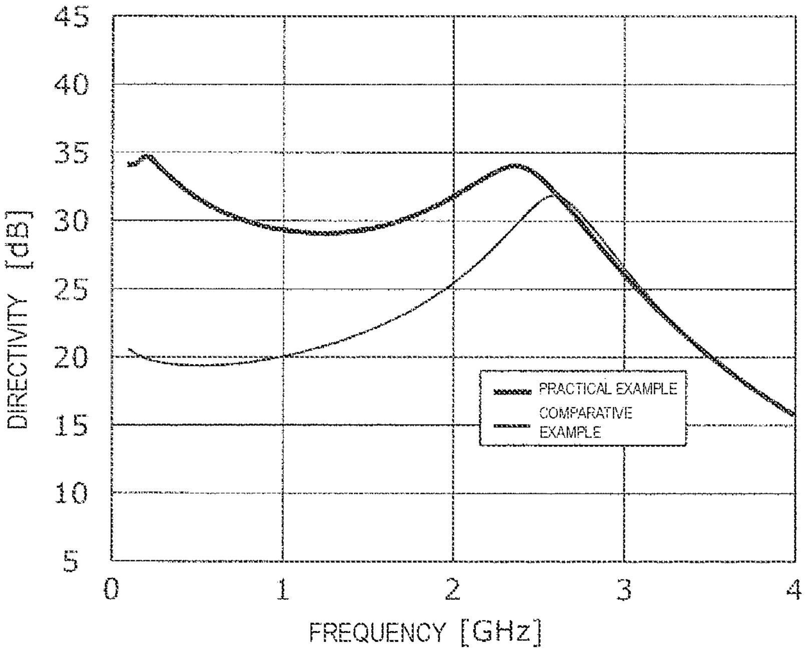
FIG. 6 is a graph illustrating an example of the directivity of the directional coupler according to the practical example and the directivity of the directional coupler according to the comparative example.

FIG. 6 is a graph illustrating an example of the directivity of the directional coupler according to the practical example and the directivity of the directional coupler according to the comparative example. As illustrated in FIG. 6, high directivity equal to or greater than 25 dB can be achieved in a frequency width of 1 GHz in the comparative example, whereas the frequency width in the practical example is expanded (improved) to about 3 GHz.

Because the directional coupler 100 uses the variable inductor 50 including the inductors 61 and 62 coupled in series with each other, the inductance of the variable inductor 50 required to improve these characteristics can be obtained by using the downsized inductors 61 and 62.

As a result, the flexibility in arranging the inductors 61 and 62 is increased, and it is thus easy to place the inductors 61 and 62 and the main line 10 and the secondary line 20 apart from each other in the miniaturized directional coupler 100. This can consequently hinder unnecessary coupling between the inductors 61 and 62 and the main line 10 and the secondary line 20, and it is possible to prevent degradation of characteristics of the directional coupler 100 due to unnecessary coupling, in particular, degradation of directivity and variations in the degree of coupling, which can yield better characteristics.

Next, modified examples of the variable inductor used for the directional coupler according to the first embodiment will be described in detail. The variable inductors according to the modified examples described below are used for the directional coupler 100 instead of the variable inductor 50. All the variable inductors according to the modified examples include, in the same manner as the variable inductor 50, a plurality of inductors in series and a switch configured to bypass at least one of the plurality of inductors.

Figure 7:
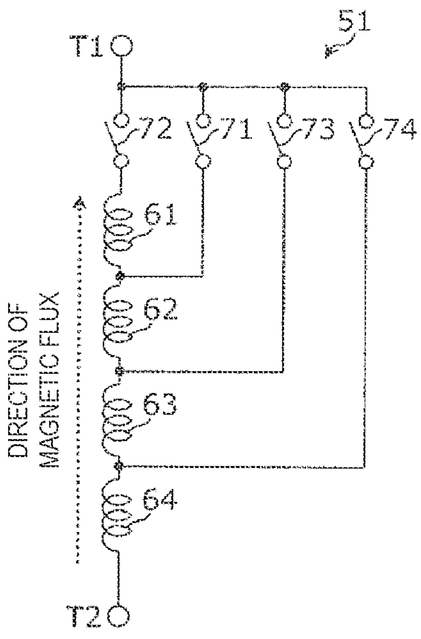
FIG. 7 is a circuit diagram illustrating an example of a configuration of a variable inductor according to a first modified example of the first embodiment.

FIG. 7 is a circuit diagram illustrating an example of a configuration of a variable inductor according to a first modified example of the first embodiment. A variable inductor 51 illustrated in FIG. 7 is formed by adding inductors 63 and 64 and switches 73 and 74 to the variable inductor 50 in FIG. 1.

The inductors 61 to 64 may be inductively coupled to each other in a direction in which the inductors 61 to 64 mutually strengthen the magnetic flux. The inductors 61 to 64 may be formed by a spiral inductor having three taps.

When the variable inductor 51 is used for the directional coupler 100, the inductors 61 to 64 are an example of a plurality of inductors coupled in series with each other between an end portion of the secondary line 20 and the ground. The switches 71 to 74 are an example of a switch configured to bypass at least one of the inductors 61 to 64.

When the switch 71 is in an off-state, the switch 72 is in an on-state, the switch 73 is in an off-state, and the switch 74 is in an off-state, the variable inductor 51 operates as an inductor formed by the inductors 61 to 64 in series.

When the switch 71 is in an on-state, the switch 72 is in an off-state, the switch 73 is in an off-state, and the switch 74 is in an off-state, the variable inductor 51 operates as an inductor formed by the inductors 62 to 64 in series. In this case, the switch 72 may be in an on-state to form a short ring including the inductor 61.

When the switch 71 is in an off-state, the switch 72 is in an off-state, the switch 73 is in an on-state, and the switch 74 is in an off-state, the variable inductor 51 operates as an inductor formed by the inductors 63 and 64 in series. In this case, the switch 71 may be in an on-state to form a short ring including the inductor 62.

When the switch 71 is in an off-state, the switch 72 is in an off-state, the switch 73 is in an off-state, and the switch 74 is in an on-state, the variable inductor 51 operates as an inductor formed by only the inductor 64. In this case, the switch 73 may be in an on-state to form a short ring including the inductor 63.

When the inductors 61 and 62 are an example of the first inductor and the second inductor, the inductor 63 is an example of a third inductor coupled adjacent to the inductor 62 serving as the second inductor. The switch 73 is an example of a third switch having one end (lower end in FIG. 7) coupled to a node between the inductor 62 and the inductor 63 serving as the third inductor and the other end (upper end in FIG. 7) coupled to the end T1 of the variable inductor 51.

The variable inductor 51 can provide at least four kinds of inductance corresponding to different portions of the inductors 61 to 64 in response to the state of the switches 71 to 74. When short rings are formed, the variable inductor 51 can provide more kinds of inductance.

The maximum amount of inductance required for the variable inductor 51 can be obtained by adding the inductance of the inductor 61, the inductance of the inductor 62, the inductance of the inductor 63, and the inductance of the inductor 64, and furthermore, it is possible to increase the inductance by inductive coupling of the inductors 61 to 64. As such, the inductance of the inductor 61, the inductance of the inductor 62, the inductance of the inductor 63, and the inductance of the inductor 64 can be lower than the maximum amount of inductance required for the variable inductor 51, and the inductors 61 to 64 can be downsized.

As a result, the flexibility in arranging the inductors 61 to 64 is increased, and it is thus easy to place the inductors 61 to 64 and the main line 10 and the secondary line 20 apart from each other in the miniaturized directional coupler 100. This can consequently hinder unnecessary coupling between the inductors 61 to 64 and the main line 10 and the secondary line 20, and it is possible to prevent degradation of characteristics of the directional coupler 100 due to unnecessary coupling, in particular, degradation of directivity and variations in the degree of coupling, which can yield better characteristics.

Figure 8:
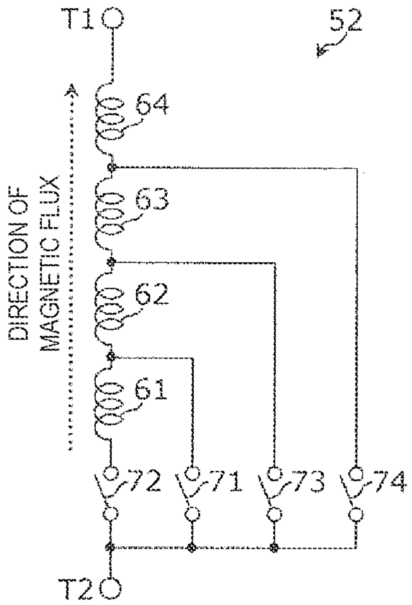
FIG. 8 is a circuit diagram illustrating an example of a configuration of a variable inductor according to a second modified example of the first embodiment.

FIG. 8 is a circuit diagram illustrating an example of a configuration of a variable inductor according to a second modified example of the first embodiment. A variable inductor 52 illustrated in FIG. 8 differs from the variable inductor 51 in FIG. 7 in that the switches 71 to 74 are coupled to the end T2 of the variable inductor 52.

The variable inductor 52 can provide the same number of kinds of inductance as the variable inductor 51. When the variable inductor 52 is used for the directional coupler 100, similarly to what has been described with regard to the variable inductor 51, the directional coupler 100 can be downsized because the inductors 61 to 64 can be downsized, and also the directional coupler 100 can achieve improved performance.

When the variable inductor 51 in FIG. 7 is compared to the variable inductor 52 in FIG. 8, the variable inductor 51 is less likely to cause parasitic capacitance due to an unnecessary shunt, because, when one end of each of the inductors 61 to 64 is disconnected by a corresponding one of the switches 71 to 74, the other end of each of the inductors 61 to 64 is coupled to not the line side (end T1 side) on which signals are transferred at a high voltage but the ground side (end T2 side). Additionally, the variable inductor 51 can easily reduce unnecessary electric-field coupling with peripheral circuits, and hence, the variable inductor 51 can be used.

Figure 9:
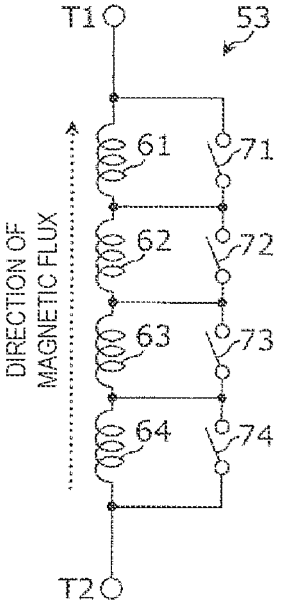
FIG. 9 is a circuit diagram illustrating an example of a configuration of a variable inductor according to a third modified example of the first embodiment.

FIG. 9 is a circuit diagram illustrating an example of a configuration of a variable inductor according to a third modified example of the first embodiment. A variable inductor 53 illustrated in FIG. 9 differs from the variable inductor 51 in FIG. 7 in that one end and the other end of each of the switches 71 to 74 are coupled to one end and the other end of a corresponding one of the inductors 61 to 64. In FIG. 9, the inductors 61 to 64 are an example of a fourth inductor, and the switches 71 to 74 are an example of a fourth switch.

The variable inductor 53 can also provide a plurality of kinds of inductance. When the variable inductor 53 is used for the directional coupler 100, similarly to what has been described with regard to the variable inductor 51, the directional coupler 100 can be downsized because the inductors 61 to 64 can be downsized, and also the directional coupler 100 can achieve improved performance.

Figure 10:
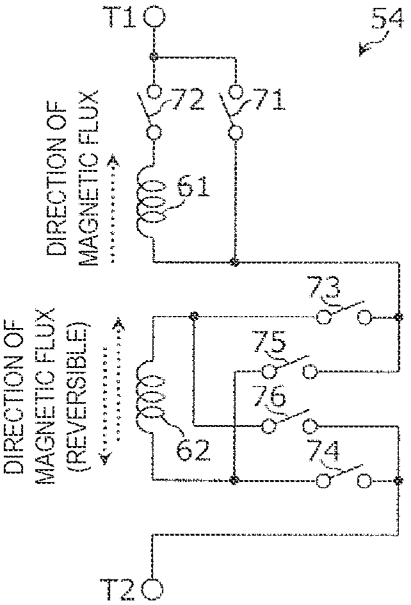
FIG. 10 is a circuit diagram illustrating an example of a configuration of a variable inductor according to a fourth modified example of the first embodiment.

FIG. 10 is a circuit diagram illustrating an example of a configuration of a variable inductor according to a fourth modified example of the first embodiment. In a variable inductor 54 illustrated in FIG. 10, the coupling direction of the inductor 62 of the inductors 61 and 62 can be changed.

The variable inductor 54 includes the inductors 61 and 62 and switches 71 to 76. The inductor 62 is an example of a fifth inductor. The switch 73 is an example of a fifth switch coupled to one end (upper end in FIG. 10) of the inductor 62 in series with the inductor 62. The switch 74 is an example of a sixth switch coupled to the other end (lower end in FIG. 10) of the inductor 62 in series with the inductor 62. The switch 75 is an example of a seventh switch coupled in parallel with a series circuit formed by the inductor 62 and the switch 73. The switch 76 is an example of an eighth switch coupled in parallel with a series circuit formed by the inductor 62 and the switch 74.

In the variable inductor 54, the coupling direction in which the inductor 62 is coupled in series with the inductor 61 can be changed between the case in which the switch 71 is in an on-state and the switches 73 and 74 are in an on-state and the case in which the switch 71 is in an on-state and the switches 75 and 76 are in an on-state.

In the state in which the switch 71 is in an on-state, when the switches 74 and 75 are in an on-state or when the switches 73 and 76 are in an on-state, the inductor 62 is bypassed by using only the inductor 61.

In the state in which the switch 71 is in an on-state, when the switches 73, 74, 75, and 76 are in an on-state, a short ring can be formed by using the inductors 61 and 62 in which the both ends of the inductor 62 are short-circuited.

The variable inductor 54 can implement the following specific behavior in accordance with the basic functions described above.

For example, by causing the switches 71, 73, and 74 to be in an on-state, the direction of magnetic-field coupling between the inductors 61 and 62 is directed to cause the inductors 61 and 62 to mutually strengthen the magnetic field when current flows through the inductors in series, and as a result, it is possible to increase the inductance of the inductors by self-induction.

For example, by causing the switches 71, 75, and 76 to be in an on-state, the direction of magnetic-field coupling can be directed to cause the inductors mutually weaken the magnetic field, and consequently, the inductance is less than if the inductors 61 and 62 are simply coupled in series with each other. At the same time, it is possible to decrease the Q factor and expand the operational band width.

For example, by causing the switches 71, 74, and 75 to be in an on-state, the inductor 62 can be bypassed, and as a result, the inductance is based on only the inductor 61.

For example, by causing the switches 72, 73, and 74 to be in an on-state, the inductor 61 can be bypassed, and as a result, the inductance is based on only the inductor 62.

For example, by causing the switches 71, 73, 74, 75, and 76 to be in an on-state, it is possible to form a short ring by using the inductors 61 and 62 in which the both ends of the inductor 62 are short-circuited, and as a result, the inductance is less than if only the inductor 61 is used. At the same time, it is possible to decrease the Q factor and expand the operational band width.

For example, by causing the switches 71, 72, 73, and 74 to be in an on-state, it is possible to form a short ring by using the inductors 61 and 62 in which the both ends of the inductor 61 are short-circuited, and as a result, the inductance is less than if only the inductor 62 is used. At the same time, it is possible to decrease the Q factor and expand the operational band width.

In the variable inductors 53 and 54, when the variable resistor 42 is included after the end T2, the switches 71 to 76 can be in an on-state to bypass all the inductors in the variable inductors 53 and 54. In this case, because all the inductors in the variable inductors 53 and 54 are bypassed, the variable inductors 53 and 54 appear to be short-circuited; however, because the variable resistor 42 is coupled in series with the variable inductors 53 and 54, the configuration is the same as the case in which only the variable resistor 42 is coupled to an end portion of the directional coupler.

Second Embodiment

A directional coupler according to a second embodiment will be described by using as an example a directional coupler formed as a module.

Figure 11:
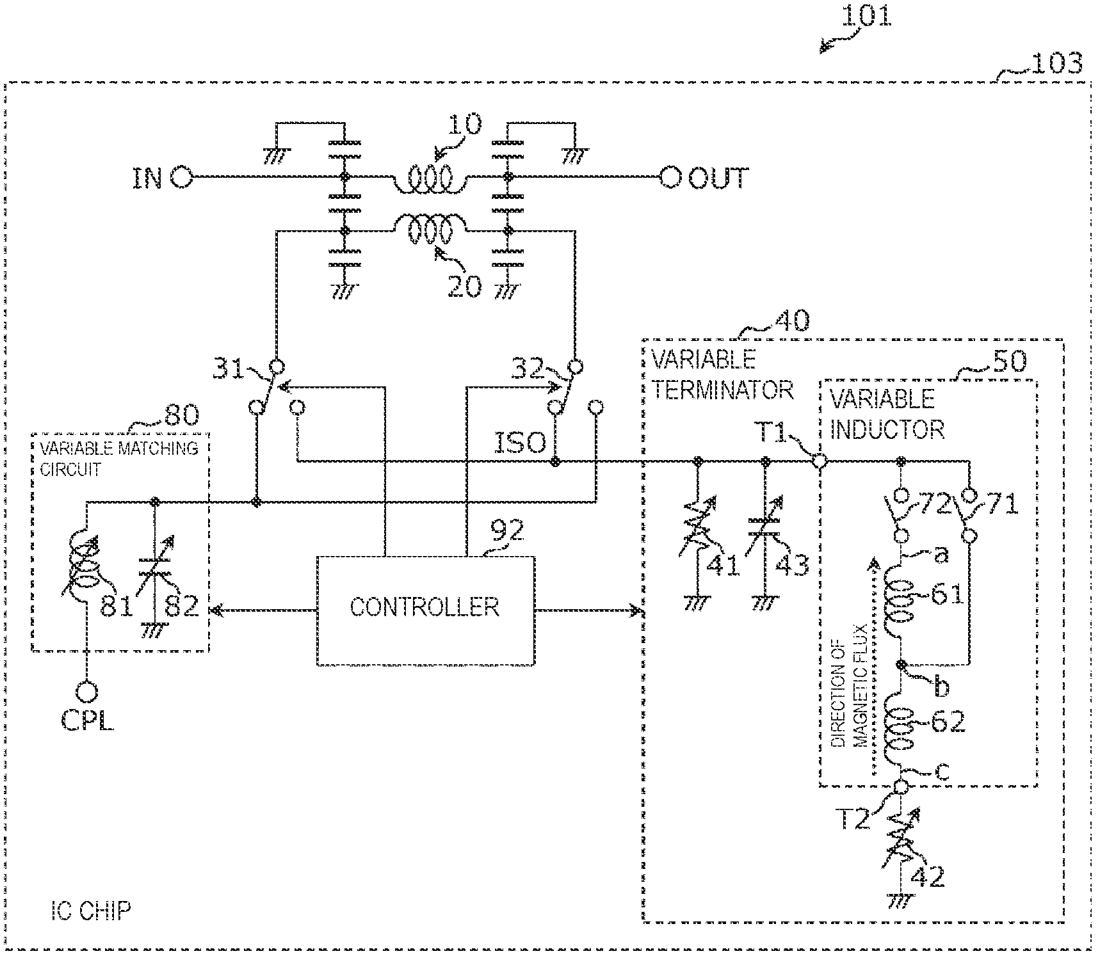
FIG. 11 is a circuit diagram illustrating an example of a configuration of a directional coupler according to a second embodiment.

FIG. 11 is a circuit diagram illustrating an example of a configuration of the directional coupler according to the second embodiment.

As illustrated in FIG. 11, a directional coupler 101 differs from the directional coupler 100 in FIG. 1 in adding a variable matching circuit 80 and adding to a controller 92 a function of controlling the variable matching circuit 80. The variable matching circuit 80 is formed by a variable inductor 81 and a variable capacitor 82. The variable matching circuit 80 is coupled between an end portion for signal output of the secondary line 20 and the coupled port CPL. In FIG. 11, the main line 10 and the secondary line 20 of the directional coupler 101 are illustrated as an LC equivalent circuit.

Figure 12:
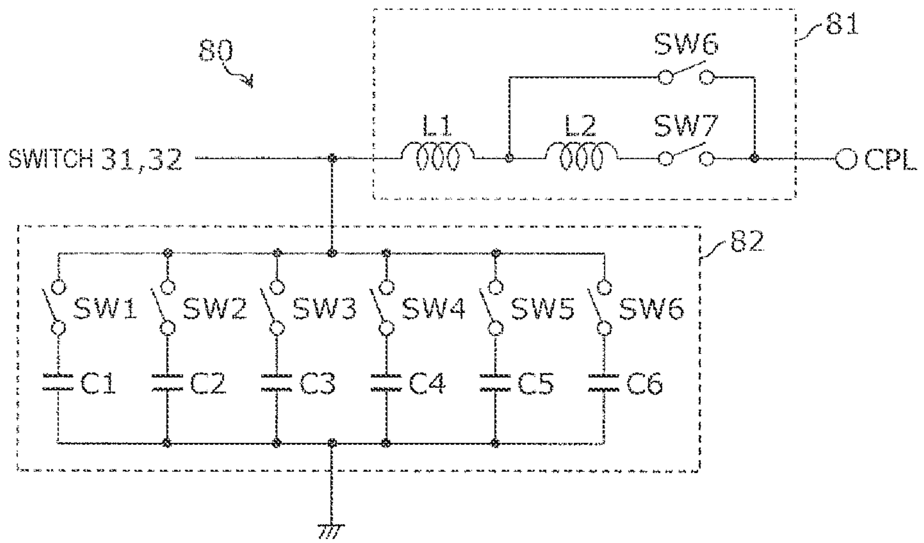
FIG. 12 is a circuit diagram illustrating an example of a configuration of a variable matching circuit according to the second embodiment.

FIG. 12 is a circuit diagram illustrating an example of a configuration of the variable matching circuit 80. As illustrated in FIG. 12, in the variable matching circuit 80, the variable inductor 81 is configured in the same manner as the variable inductor 50 (FIG. 1) described above, and the variable capacitor 82 is configured in the same manner as the variable capacitor 43 (FIG. 3) described above.

The impedance of the variable matching circuit 80 in FIG. 12, that is, the inductance of the variable inductor 81 and the capacitance of the variable capacitor 82 can be controlled by the controller 92 switching switches. The switches used to obtain adjustable impedance in the variable matching circuit 80 may be implemented by, for example, transistors, microelectromechanical systems (MEMS) switches, or diode switches.

Figure 13:
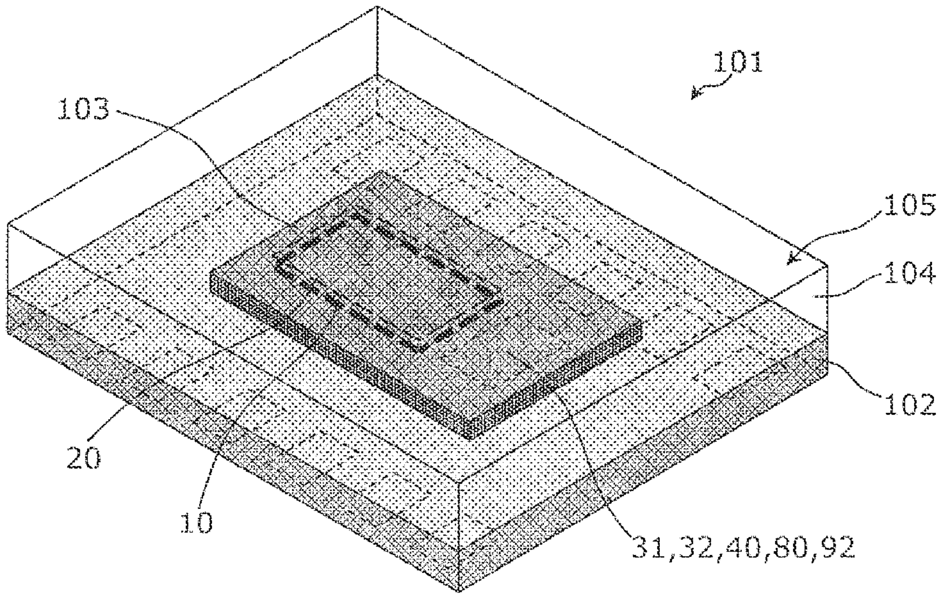
FIG. 13 is a perspective view illustrating an example of a structure of a module according to the second embodiment.

FIG. 13 is a perspective view illustrating an example of a structure of a module including a directional coupler. A module having the directional coupler 101 includes an integrated circuit (IC) chip 103 and a module terminal substrate 102 made of a dielectric material. The IC chip 103 is mounted on the module terminal substrate 102.

The main line 10, the secondary line 20, the switches 31 and 32, the variable terminator 40, the variable matching circuit 80, and the controller 92 of the directional coupler 101 are formed inside the IC chip 103. Because a circuit formed by these constituent elements is formed inside the IC chip 103, it is possible to downsize the circuit and also ease formation of the circuit and control of the circuit.

When the main line 10, the secondary line 20, and the variable terminator 40 are all formed inside the IC chip 103, the layout space is limited more than if the main line 10, the secondary line 20, or the variable terminator 40 is formed outside the IC chip 103; consequently, the distance between the variable terminator 40 and the main line 10 and the secondary line 20 tends to be short.

In this regard, the variable inductor 50 included in the variable terminator 40 is configured as illustrated in FIG. 1, and as a result, the inductors constituting the variable inductor 50 can be easily downsized; this configuration hinders unnecessary coupling between the main line 10 and the secondary line 20 and the variable inductor 50 in a limited layout space.

Thus, when the directional coupler 101 is structured as illustrated in FIG. 13, the present disclosure is particularly useful.

As for the circuit coupled to the secondary line 20 of the directional coupler 101, if loss occurs because the circuit is formed inside the IC chip 103, the loss can be added to the degree of coupling, and thus, this does not cause significant disadvantages.

The IC chip 103 is fixed by a solder bump on one major surface of the module terminal substrate 102. To protect the IC chip 103, the major surface with the IC chip 103 of the module terminal substrate 102 is covered by transfer molding using an epoxy-type resin 104, and the surface of the resin 104 is covered by a metal thin film 105. The metal thin film 105 is formed by employing sputtering, plating, or a combination of these methods with a metallic material. The metal thin film 105 is coupled to a ground electrode at an end surface of the module terminal substrate 102 (not illustrated in the drawing).

As the dielectric material forming the module terminal substrate 102, for example, resin materials, such as bismaleimide-triazine, epoxy, polyimide, and Teflon (registered trademark), glass cloth, ceramics, or composite materials thereof are utilized.

Although FIG. 13 illustrates the structure in which the IC chip 103 is mounted on the module terminal substrate 102, when all the constituent elements of the directional coupler 101 are formed inside the IC chip 103, the IC chip 103 is not necessarily mounted on the module terminal substrate 102.

At least one of some constituent elements, such as the main line 10, the secondary line 20, and the plurality of inductors constituting the variable inductor 50 of the directional coupler 101 may be formed by a conductor pattern at the module terminal substrate 102.

Figure 14:
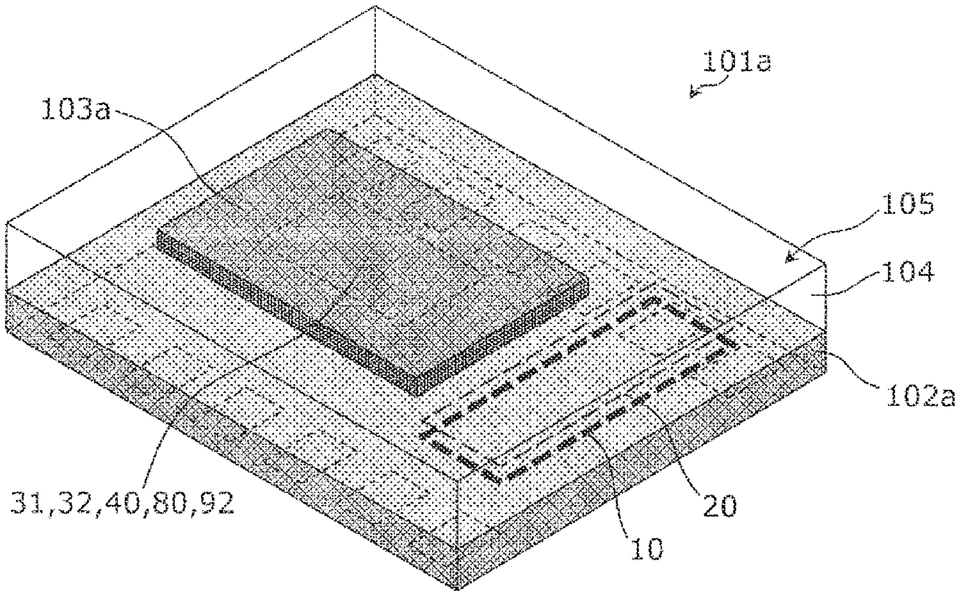
FIG. 14 is a perspective view illustrating another example of a structure of the module according to the second embodiment.

FIG. 14 is a perspective view illustrating another example of a structure of a module including a directional coupler. In the example of a directional coupler 101*a* in FIG. 14, an IC chip 103*a* does not include the main line 10 and the secondary line 20, and the main line 10 and the secondary line 20 are formed at the module terminal substrate 102*a*.

The secondary line 20 is formed as one or more oval or rectangular turns. The secondary line 20 is formed by a particularly fine line, and thus, the impedance of the secondary line 20 is on the higher side with respect to the 50Ω characteristic impedance, and the line length of the secondary line 20 is sufficiently shorter than a ¼ wave length; the secondary line 20 is thus formed as an L-characteristic inductor, that is, an inductor in which mutual coupling via magnetic and electric fields is formed.

The main line 10 is formed in the same manner as the secondary line 20 or in a straight or curved line. In the example in FIG. 14, the main line 10 is also formed as a rectangular turn.

Examples of a conductor forming the main line 10 and the secondary line 20 include metals, such as copper, silver, nickel, and gold, and alloys and composite films including these metals.

The following effects can be achieved by the directional coupler 101*a* structured, as described above, as a module in which the main line 10 and the secondary line 20 are formed at the module terminal substrate 102*a*.

In the directional coupler 101*a*, the main line 10 and the secondary line 20 are formed as inductors made of conductor patterns inside the module terminal substrate 102*a*. As a result, copper loss in the main line 10 is reduced, and this yields the directional coupler 101*a* with low insertion loss. Because the secondary line 20 is formed at the same module terminal substrate 102*a* as the main line 10, the degree of coupling and the directivity can be stable.

A main signal transferred through the main line 10 does not enter the IC chip 103*a*, and thus, it is possible to minimize the non-linear effect caused by a semiconductor material forming the IC chip 103*a*. A detection signal outputted from the secondary line 20 is processed in the IC chip 103*a*. The electric power of the detection signal is usually 10 to 30 dB lower than the main signal, and thus, the distortion of the detection signal is relatively small.

The variable terminator 40 and the variable matching circuit 80 are matched to exhibit a very low reflection characteristic; thus, although a distortion signal of very small power is generated on the basis of the signal transferred to the variable terminator 40 and the variable matching circuit 80, the rate of the distortion signal reflected back to the secondary line 20 is low. Further, a certain degree of coupling is also achieved when the distortion signal returns to the main line 10, and thus, the distortion wave becomes smaller. As a result, the directional coupler 101*a* can be implemented with a low distortion characteristic.

As compared to the main line 10 and the secondary line 20 formed as inductors made of conductor patterns inside the module terminal substrate 102*a*, the inductors used in the variable terminator 40 and the variable matching circuit 80 are formed by relatively extremely fine conductors in the IC chip 103*a*, and as a result, the inductors can be miniaturized to a great extent but cannot achieve a high Q factor. This point can be, however, considered advantageous because, unlike the main line 10 for processing main signals of high electric power, reducing the Q factor contributes to expanding the operational band width of the variable terminator 40, and the loss in the variable matching circuit 80 can be added to the degree of coupling.

As described above, the directional coupler 101 can implement a compact directional coupler with excellent characteristics, similarly to the directional coupler 100.

The directional coupler of the present disclosure has been described in accordance with the embodiments, but the present disclosure is not limited to the embodiments. Without necessarily departing from the scope of the present disclosure, embodiments obtained by making various modifications, which occur to those skilled in the art, on the embodiments, and embodiments constructed by combining the constituent elements in the different embodiments with each other may be also embraced in the range of one or more aspects of the present disclosure.

INDUSTRIAL APPLICABILITY

The present disclosure can be used as a directional coupler capable of precisely controlling the degree of coupling and the directivity in a wide variety of radio devices such as mobile terminal devices.

REFERENCE SIGNS LIST

1 directional coupler
10 main line
11, 12 end portion (of main line)
20 secondary line
21, 22 end portion (of secondary line)
31, 32, 71-76 switch
40 variable terminator
41, 42 variable resistor
43, 82 variable capacitor
50-54, 81 variable inductor
60 spiral inductor
61-64 inductor
80 variable matching circuit
91, 92 controller
100, 101, 101*a* directional coupler
102, 102*a* module terminal substrate
103, 103*a* IC chip
104 resin
105 metal thin film

The invention claimed is:

1. A directional coupler comprising:
a main line;
a secondary line; and
a variable terminator,
wherein the variable terminator comprises a variable inductor,
wherein the variable inductor comprises:
a plurality of inductors in series with each other between an end of the secondary line and ground, and
a switch configured to selectively bypass at least one inductor of the plurality of inductors, and
wherein at least two inductors of the plurality of inductors are spiral inductors having a middle lead point.

2. The directional coupler according to claim 1, wherein:
the plurality of inductors comprises a first inductor and a second inductor that are adjacent to each other,
the switch comprises a first switch, and
a first end of the first switch is connected to a node between the first inductor and the second inductor, and a second end of the first switch is connected to a first end or a second end of the variable inductor.

3. The directional coupler according to claim 2, wherein:
the switch further comprises a second switch, and
a first end of the second switch is connected to an inductor of the plurality of inductors that is closest to the first end of the variable inductor, and a second end of the second switch is connected to the first end of the variable inductor.

4. The directional coupler according to claim 2, wherein:

the plurality of inductors further comprises a third inductor adjacent to the first inductor or the second inductor, the switch further comprises a third switch, and a first end of the third switch is connected to a node between the first or second inductor and the third inductor, and a second end of the third switch is connected to the first or the second end of the variable inductor.

5. The directional coupler according to claim 1, wherein:

the plurality of inductors comprises a fourth inductor, the switch comprises a fourth switch, and a first end and a second end of the fourth switch are respectively connected to a first end and a second end of the fourth inductor.

6. The directional coupler according to claim 1, wherein:

the plurality of inductors comprises a fifth inductor, the switch comprises a fifth switch, a sixth switch, a seventh switch, and an eighth switch, the fifth switch is connected to a first end of the fifth inductor and the fifth switch is in series with the fifth inductor, the sixth switch is connected to a second end of the fifth inductor and the sixth switch is in series with the fifth inductor, the seventh switch is connected in parallel with the fifth inductor and the fifth switch, and the eighth switch is connected in parallel with the fifth inductor and the sixth switch.

7. The directional coupler according to claim 1, wherein the variable terminator further comprises a resistor between the variable inductor and ground.

8. The directional coupler according to claim 7, wherein the resistor is a variable resistor.

9. The directional coupler according to claim 1, wherein the main line, the secondary line, and the plurality of inductors are in an integrated circuit.

10. The directional coupler according to claim 1, wherein the at least two inductors of the plurality of inductors are inductively coupled to each other.

11. The directional coupler according to claim 10, wherein a direction of magnetic flux of one inductor of the two inductors is identical to a direction of magnetic flux of another inductor of the two inductors.

12. The directional coupler according to claim 10, wherein a direction of magnetic flux of one inductor of the two inductors is opposite to a direction of magnetic flux of another inductor of the two inductors.

13. The directional coupler according to claim 1, wherein the variable terminator further comprises a variable resistor between the end of the secondary line and ground.

14. The directional coupler according to claim 1, wherein the variable terminator further comprises a variable capacitor between the end of the secondary line and ground.

* * * * *